US010494107B2

(12) United States Patent
Dardona et al.

(10) Patent No.: US 10,494,107 B2
(45) Date of Patent: Dec. 3, 2019

(54) ADDITIVE MANUFACTURING OF CONFORMAL DEICING AND BOUNDARY LAYER CONTROL SURFACE FOR AIRCRAFT

(71) Applicant: Goodrich Corporation, Charlotte, NC (US)

(72) Inventors: Sameh Dardona, South Windsor, CT (US); Marcin Piech, East Hampton, CT (US); Jacquelynn K M Garofano, Prospect, CT (US); Ray-Sing Lin, Glastonbury, CT (US); Paul Sheedy, Bolton, CT (US); Wayde R. Schmidt, Pomfret Center, CT (US)

(73) Assignee: Goodrich Corporation, Charlotte, NC (US)

( * ) Notice: Subject to any disclaimer, the term of this patent is extended or adjusted under 35 U.S.C. 154(b) by 391 days.

(21) Appl. No.: 15/397,552

(22) Filed: Jan. 3, 2017

(65) Prior Publication Data

US 2018/0186460 A1     Jul. 5, 2018

(51) Int. Cl.
*B64D 15/12* (2006.01)
*C23C 24/04* (2006.01)
(Continued)

(52) U.S. Cl.
CPC ............. *B64D 15/12* (2013.01); *C23C 4/12* (2013.01); *C23C 24/04* (2013.01); *B33Y 10/00* (2014.12); *B33Y 70/00* (2014.12); *B33Y 80/00* (2014.12)

(58) Field of Classification Search
CPC ........ B64D 15/00; B64D 15/12; B64D 15/14; B64D 2033/0233; F02C 7/047; H05B 3/26; H05B 3/12
See application file for complete search history.

(56) References Cited

U.S. PATENT DOCUMENTS

| 4,021,008 A * | 5/1977 | Eichenauer | ............ B64D 15/12 244/134 D |
| 4,732,351 A * | 3/1988 | Bird | ............ B64D 15/163 244/134 D |

(Continued)

FOREIGN PATENT DOCUMENTS

| EP | 2196393 A1 * | 6/2010 | ............. B64D 15/12 |
| EP | 3373700 A1 * | 9/2018 | ........... B29C 64/106 |

OTHER PUBLICATIONS

Extended European Search Report, for European Patent Application No. 17210087.7, dated May 22, 2018, 6 pages.

*Primary Examiner* — Benjamin P Lee
(74) *Attorney, Agent, or Firm* — Kinney & Lange, P.A.

(57) ABSTRACT

A multilayer structure for deicing an aircraft airfoil component includes an electrically and thermally insulating bottom layer formed in a defined pattern directly on the aircraft airfoil component, an electrothermal middle layer of electrically resistant heater element arrays formed in the defined pattern on the electrically and thermally insulating bottom layer, and a thermally conductive and electrically insulating top layer encapsulating the electrically and thermally insulating bottom layer and the electrothermal middle layer of electrically resistant heater element arrays. The multilayer structure may be directly applied to the airfoil component by direct writing/additive manufacturing, and may be done with the assistance of a multi-axis robot.

20 Claims, 2 Drawing Sheets

(51) Int. Cl.
*C23C 4/12* (2016.01)
*B33Y 10/00* (2015.01)
*B33Y 80/00* (2015.01)
*B33Y 70/00* (2015.01)

(56) References Cited

U.S. PATENT DOCUMENTS

| | | | | |
|---|---|---|---|---|
| 5,925,275 | A * | 7/1999 | Lawson | B64D 15/12 |
| | | | | 219/543 |
| 8,431,869 | B2 * | 4/2013 | Raghavan | H05B 3/84 |
| | | | | 219/203 |
| 9,091,657 | B2 | 7/2015 | Kessler et al. | |
| 9,193,466 | B2 * | 11/2015 | Calder | B64D 15/12 |
| 9,346,550 | B2 | 5/2016 | Gambino et al. | |
| 9,490,414 | B2 | 11/2016 | de Rochemont | |
| 9,511,871 | B2 * | 12/2016 | Steinwandel | B64D 15/12 |
| 9,829,203 | B2 * | 11/2017 | Yang | F24D 19/1096 |
| 10,159,116 | B2 * | 12/2018 | Ptasienski | H05B 3/28 |
| 2007/0187381 | A1 * | 8/2007 | Vontell, Sr. | F01D 5/18 |
| | | | | 219/202 |
| 2007/0210073 | A1 * | 9/2007 | Hubert | B64D 15/12 |
| | | | | 219/535 |
| 2011/0167781 | A1 * | 7/2011 | Maheshwari | F02C 7/047 |
| | | | | 60/39.093 |
| 2013/0043342 | A1 * | 2/2013 | Nordin | B64C 3/20 |
| | | | | 244/1 A |
| 2014/0014640 | A1 * | 1/2014 | Calder | B64D 15/12 |
| | | | | 219/202 |
| 2014/0131520 | A1 * | 5/2014 | Boone | B64D 15/12 |
| | | | | 244/134 D |
| 2014/0234552 | A1 | 8/2014 | Frankenberger | |
| 2016/0007474 | A1 * | 1/2016 | Dardona | H05B 3/265 |
| | | | | 219/543 |
| 2016/0138814 | A1 * | 5/2016 | Yang | F24D 19/1096 |
| | | | | 219/494 |
| 2016/0159485 | A1 * | 6/2016 | Le Garrec | B64D 15/12 |
| | | | | 244/134 D |
| 2016/0221664 | A1 | 8/2016 | Lin et al. | |
| 2016/0302264 | A1 | 10/2016 | Kessler et al. | |
| 2018/0215476 | A1 * | 8/2018 | Chee | B64D 15/12 |
| 2018/0263081 | A1 * | 9/2018 | Dardona | B29C 64/106 |
| 2019/0039746 | A1 * | 2/2019 | Brooks | B64D 15/12 |

* cited by examiner

ADDITIVE MANUFACTURING OF CONFORMAL DEICING AND BOUNDARY LAYER CONTROL SURFACE FOR AIRCRAFT

BACKGROUND

The present disclosure relates to a deicing circuit assembly, in particular to an additively manufactured deicing circuit assembly and method of manufacture.

Deicing circuits are typically made by photochemically etching metallic alloy foils on a substrate that is subsequently built into electrothermal heater composites wherein the foils are attached to substrates prior to etching. This method of manufacture suffers from insufficient repeatability due to over or under etching, photoresist alignment issues, delamination of the photoresists, poor adhesion to the substrates, etc. Also, the process is quite time and labor intensive and results in a significant amount of chemical waste.

In the case of a propeller blade, the deicing element is made via photochemical etching of copper alloys. An example is copper containing 0.6 to 1.2 wt % chromium. After fabrication, the element is transferred and attached to a neoprene substrate, then wrapped around the blade edge. This assembly process introduces internal stresses or fatigue associated with bending and folding of the etched metal foils into the deicing element. Additionally, the surface irregularities/roughness associated with this fabrication process may induce turbulent flow on a propeller blade. Alternate fabrication techniques for deicing circuits that minimize turbulent flow are needed.

SUMMARY

A multilayer structure for deicing an aircraft airfoil includes an electrically and thermally insulating bottom layer, an electrothermal middle layer containing electrical resistant heater element arrays and interconnections, and a thermally conductive and electrically insulating top layer.

In an embodiment a method of forming a multilayer structure for deicing an aircraft airfoil includes forming a bottom layer of electrical and thermally insulating materials on the airfoil by additive manufacturing, forming an electrothermal middle layer containing electrical resistant heater element arrays on the bottom layer by additive manufacturing, and forming a thermally conductive and electrically insulative top layer on the middle layer by additive manufacturing.

DETAILED DESCRIPTION

Figure 1:
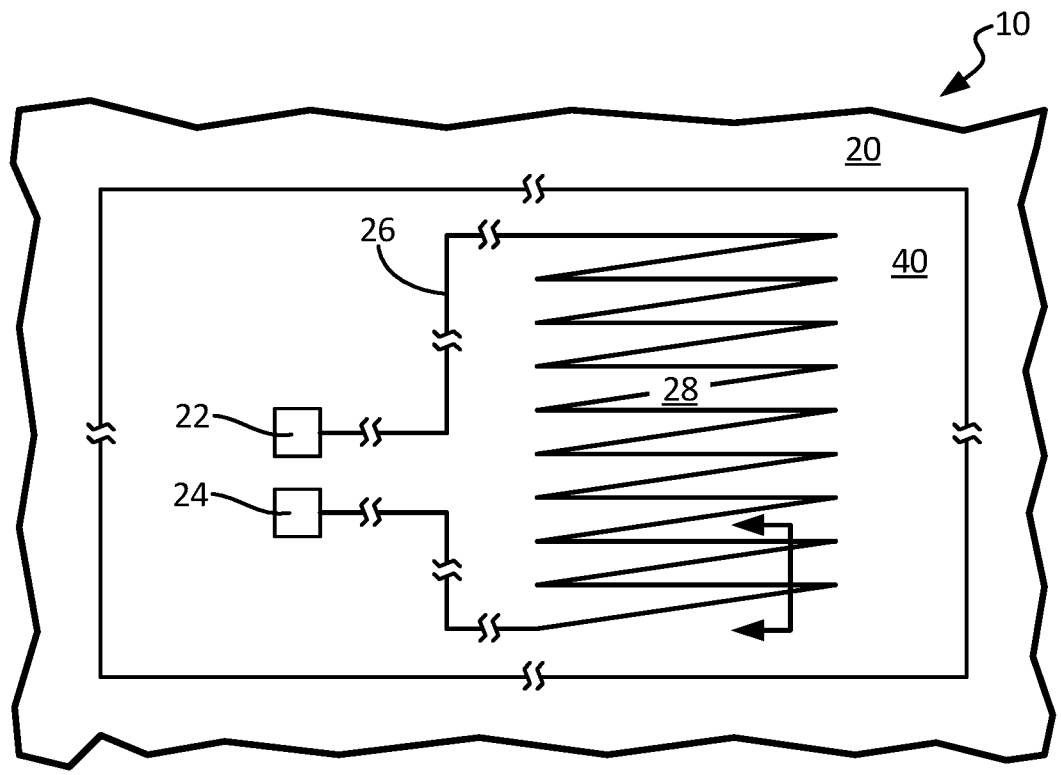
FIG. 1 is a plan view of a heating circuit assembly according to an exemplary embodiment of the present disclosure.
Figure 2:
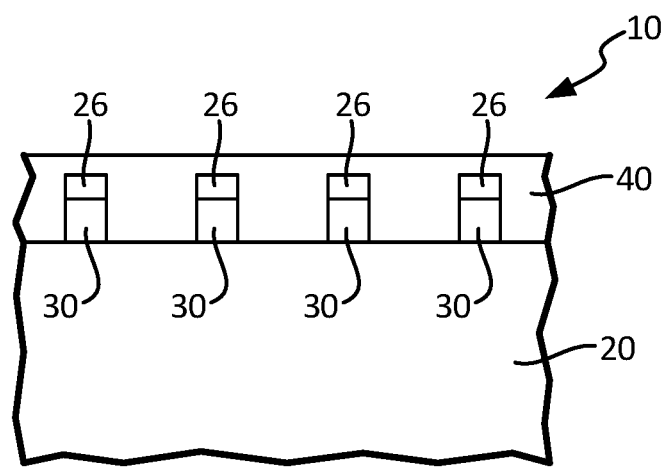
FIG. 2 is a cross-section of the heating circuit assembly taken along line A-A of FIG. 1.

A schematic plan view of an embodiment of a multilayer deicing heating circuit is shown in FIG. 1. Multilayer deicing heating circuit structure 10 comprises substrate 20 which may be an airfoil or other suitable structure requiring deicing. Substrate 20 may be a polymer, fiberglass, metal, ceramic, organic or carbon based composite, or another structural avionic material known in the art. Electrical contacts 22 and 24 allow for electrical connection to electrically conductive resistive heating elements 26 in deicing heater array 28. Heater array 28 may be a patterned maze of heating elements tailored to deice different regions under different temperature conditions according to the diameter and areal density of the resistive heating elements in each region. Electrical contacts 22 and 24 are electrical supply and return leads of the heating circuit. Electrical contacts 22 and 24 and resistive heating elements 26 in array 28 are isolated from substrate 20 by electrically and thermally insulating material 30 as shown in cross-section AA in FIG. 2. Heating elements 26 may be any one or more of silver, iron, chromium, copper, nickel, cobalt, aluminum, and alloys thereof, and may be carbon-based including graphene, graphite, carbon black, carbon nanotubes, carbon nanofibers or combinations thereof.

In the system of the present disclosure, the heating element arrays are formed directly on the component surface (substrate 20) by direct ink writing (DIW) or another additive manufacturing processes. Electrical and thermal insulating layer 30 may be a polyimide material such as Kapton, or other organic or ceramic materials such as silicones, fluoropolymers, glass or insulating oxides. Electrical and thermal insulating layer 30 may also be a ceramic or composite including aluminum oxide, polymer matrix composite, glass or nitride based coating.

The third component of heating structure 10 is thermally conductive and electrically insulating encapsulation layer 40. Encapsulation layer 40 may be aluminum nitride, vanadium oxide, boron nitride, silicon nitride, silicon oxycarbide, and silicate-based glass. Additional additives with high thermal conductivity may be added to the material of encapsulation layer 40 to further control thermal properties. Examples include aluminum nitride, silicon carbide, boron carbide, carbon nanotubes, graphene and diamond.

According to an exemplary embodiment, conformal deicing heating element patterns may be printed by DIW or other methods generally known in the art directly on the component surface (substrate 20). The pattern may be delivered by one or more of many additive manufacturing methods including aerosol jet deposition, extrusion, ink jet, micro-cold spray deposition, mesoplasma spray (miniaturized thermal spray) deposition, ultrasonic spray deposition and others known in the art. The pattern may be printed with feature widths ranging from about 15 microns to about 3 millimeters and with thicknesses ranging from about 100 nanometers to about 1 millimeter. Heating elements in the pattern may be formed from powders, inks, pure metals and alloys, and/or resistive polymers. Multiple layers of patterns with different materials are also contemplated.

The conformal deicing structures disclosed herein are designed to provide many functions including thermal and electrical performance that increase heating efficiency, mitigate risks of failure through redundant current paths in the electrothermal layer, and maximize in-plane thermal conductivity in the top layer. The structures may also be designed with optimized topology that creates a thin conformal boundary layer that maximizes aerodynamic performance and minimizes turbulent boundary flow.

The geometrical placement of heating elements 26 in deicing array 28 and electrically and thermally insulating elements 30 in deicing heating circuit structure 10 requires precise control. In an embodiment, such control is achieved by performing this task with a preprogrammed multi-axis robot. In an embodiment, a five axis robot is preferred. Three features are required for a successful build of a thermally efficient aerodynamic deicing surface structure. The first is a structure that radiates heat away from the surface. This is accomplished by precise alignment of thermally and electrically insulating layer 30 under heater element 26 thereby directing the heat away and up from the substrate and minimizing the amount (and mass) of layer 30 in the structure. The second feature is a deicing heater element pattern that has a geometry that provides heating zones on the surface of the component that are regionally controlled to control and extend the boundary layer over the component (i.e., airfoil) surface. It is preferred that the geometrics of the heater element patterns are optimized to match the desired heating needs of the application. In one example, the heater element patterns are optimized using available topology optimization software. The third feature is a smooth defect free aerodynamic surface. The multi-axis robot can perform all functions. Before a build, the robot may scan the surface topology and insert the topology in a memory. During the build, imperfections in the surface are eliminated during deposition of thermally conductive and electrically insulating encapsulation layer 40 so that a smooth surface is formed.

Deicing heating circuit structure 10 may be additively manufactured on substrate 20 by printing or extruding an ink or slurry that contains metal, polymer, and/or ceramic precursors using a printing head known in the industry. Curing of the printed ink may be with ultraviolet (UV) radiation, photonic curing, thermal curing, microwave or radio frequency curing, or exposure to one or more laser beams. In the present disclosure, the printing head may be attached to a multi-axis robot, such as a five axis robot. Suitable deposition systems are aerosol jet (AJ) deposition, extrusion, ink jet, micro-cold spray, and mesoplasma spray (miniaturized thermal spray) deposition, and ultrasonic spray deposition, for example.

Figure 3:
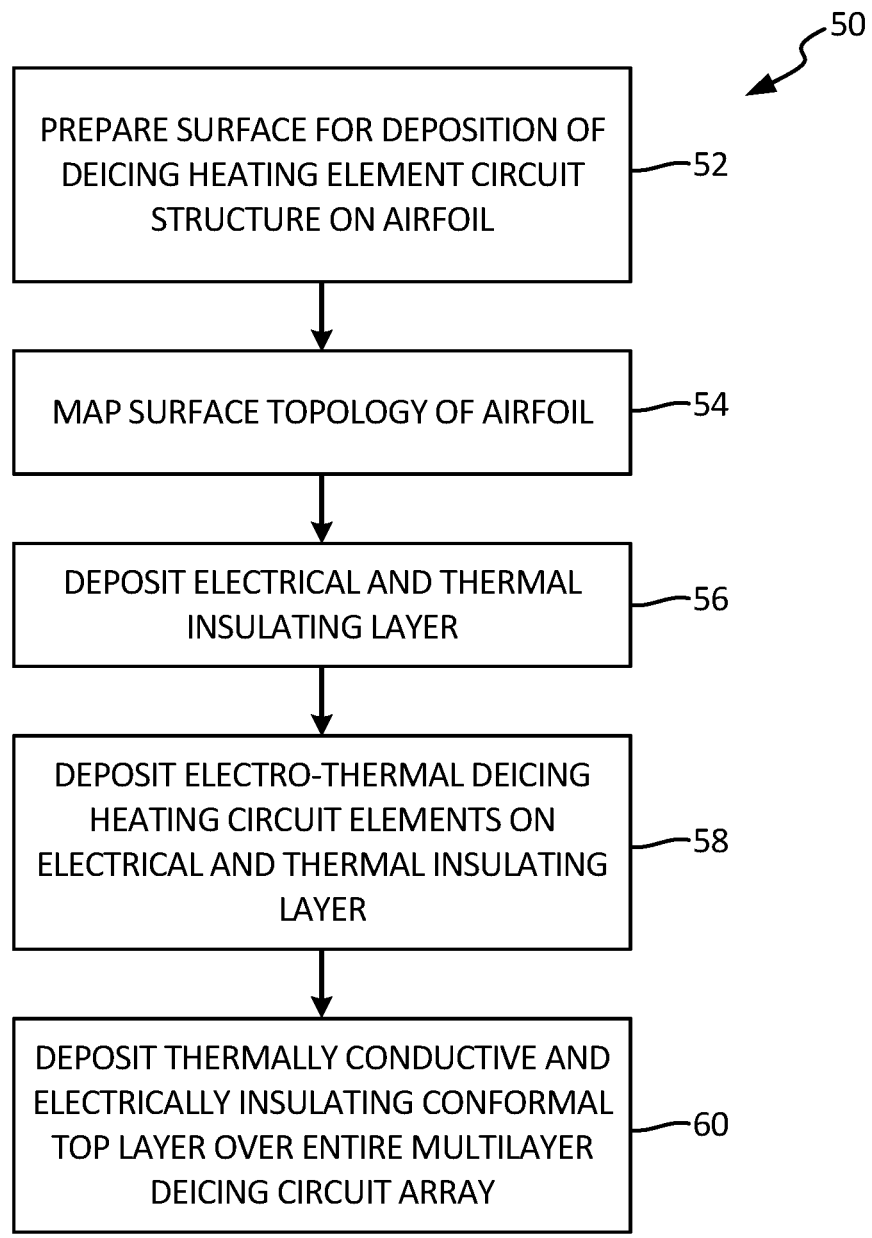
FIG. 3 is a flow chart illustrating a method of manufacturing a heating circuit assembly.

Method 50 of fabricating multilayer deicing heating circuit structure 10 on an aircraft component surface by additive manufacturing is shown in FIG. 3. In the first step, the surface of the component, in this case an aircraft airfoil, is cleaned in preparation for deposition of a deicing heating circuit structure (step 52). Cleaning may be performed by methods well known in the art such as mechanical (abrasive), chemical (etchants), solvents, and others known in the art.

In the next step the surface topology of the component in the region where the circuit structure will be located is measured to the resolution necessary (step 54). The resolution in this case may be within about 5 microns to about 500 microns, and preferably within about 10 microns to about 250 microns. An instrument useful for this measurement may be a sensor mounted on a multi-axis robot. The measurements may be stored in the memory of a control system of the robot for subsequent deposition of the deicing heating element circuit structure on the surface that has been mapped.

In the next step the electrically and thermally insulating layer is deposited on the component. The insulating layer is deposited in a pattern identical to the pattern of heating element arrays that will be subsequently deposited on the insulating layer. It is beneficial in this process to utilize the aforementioned multi-axis robot to deposit this material via a DIW process, wherein the deposition nozzle may be mounted on the robot. If necessary the insulating layer array may be cured at this point.

In the next step the conductive, electrothermal deicing elements may be deposited on the insulating layer array (step 58). As mentioned above, precise alignment of the heating elements on the insulator elements is achieved for heating efficiency as well as for material savings. At this point, the heating element arrays may be exposed to thermal or other energy sources to produce a suitable microstructure. Heating elements 26 may be silver, iron chromium, copper, nickel, cobalt, aluminum, and alloys thereof, and may be carbon-based including graphene, graphite, carbon black, carbon nanotubes, carbon nanofibers or combinations thereof.

In the final step, a thermally conductive and electrically insulating encapsulating conformal layer is deposited over the entire multilayer deicing circuit array (step 60). This layer may be formed by a DIW method or a less precise method such as spray coating, vapor deposition, a dipping process or painting method. Materials that may be used for this layer include aluminum nitride, vanadium oxide, boron nitride, silicon nitride, silicon oxycarbide, silicon carbide, and silicate-based glass.

The multilayer deicing heating circuit disclosed herein, by virtue of direct writing/additively manufacturing the structure directly on an aircraft component, has a precisely patterned electrically and thermally insulating material layer formed on the component, with a pattern that matches the pattern of the conductive electrothermal deicing heating element array formed thereon. A thermally conductive and electrically insulating encapsulating conformal layer is then formed in order to provide a smooth, defect free aerodynamic surface. As a result, a deicing heating circuit structure is achieved that has a minimal topological profile, that has a high level of conformance and adherence with the component, and that uses a minimal amount (and mass) of material.

Discussion of Possible Embodiments

The following are non-exclusive descriptions of possible embodiments of the present invention.

A multilayer structure for deicing an aircraft airfoil component may include an electrically and thermally insulating bottom layer formed in a defined pattern directly on the aircraft airfoil component; an electrothermal middle layer of electrically resistant heater element arrays formed in the defined pattern on the electrically and thermally insulating bottom layer; and a thermally conductive and electrically insulating top layer encapsulating the electrically and thermally insulating bottom layer and the electrothermal middle layer of electrically resistant heater element arrays.

The multilayer structure of the preceding paragraph can optionally include, additionally and/or alternatively, any one or more of the following features, configurations and/or additional components:

The bottom layer may be a polymer, ceramic, or mixture thereof.

The bottom layer may be polyimide, silicone, fluoropolymer, glass, UV curable resin, polymers with additives or insulating oxides.

The bottom layer may be a ceramic or composite including aluminum oxide, polymer matrix composites, glass, or nitride based coatings.

The heater element arrays may be silver, iron, chromium, copper, nickel, cobalt, aluminum and alloys thereof, graphene, graphite, carbon black, carbon nanotubes, carbon nanofibers and mixtures thereof.

The top layer may be aluminum nitride, vanadium oxide, boron nitride, silicon nitride, silicon oxycarbide, silicon carbide, silicate based glass mixtures and additives with high thermal conductivity including silicon carbide, boron carbide, carbon nanotubes, graphene, diamonds, and mixtures thereof.

The electrically and thermally insulating bottom layer and the electrothermal middle layer of electrically resistant heater element arrays may be formed by additive manufacturing.

Additive manufacturing may include aerosol jet deposition, extrusion, ink jet, micro cold spray deposition, miniaturized thermal spray deposition, ultrasonic spray deposition, and combinations thereof.

The trace widths of the heater arrays may be from 15 microns to 3 millimeters and the trace thicknesses of the heater element arrays may be from 100 nanometers to 1 millimeters.

A method of forming a multilayer structure for deicing an aircraft airfoil component may include: forming a bottom layer of electrically and thermally insulating material in a defined pattern directly on the airfoil component by additive manufacturing; forming an electrothermal middle layer of electrically resistant heater element arrays in the defined pattern on the electrically and thermally insulating bottom layer by additive manufacturing; and forming a thermally conductive and electrically insulative top layer encapsulating the electrically and thermally insulating bottom layer and the electrothermal middle layer of electrically resistant heater element arrays by additive manufacturing or thermal spraying.

The method of the preceding paragraph can optionally include, additionally and/or alternatively, any one or more of the following features, configurations and/or additional components;

Additive manufacturing may include aerosol jet deposition, extrusion, ink jet, micro cold spray deposition, miniaturized thermal spray deposition, ultrasonic spray deposition, and combinations thereof.

The heater arrays may include silver, iron, chromium, copper, nickel, cobalt, aluminum and alloys thereof, graphene, graphite, carbon black, carbon nanotubes, carbon nanofibers and mixtures thereof.

Trace widths of the heater arrays may be from 50 microns to 3 millimeters and trace thicknesses of the heater arrays may be from 100 nanometers to 1 millimeters.

The top layer may include aluminum nitride, vanadium oxide, boron nitride, silicon nitride, silicon oxycarbide, silicon carbide, silicate based glass, boron nitride, and additives with high thermal conductivity including silicon carbide, boron carbide, carbon nanotubes, graphene, diamond, and mixtures thereof.

Each layer of the additively manufactured multilayer structure may be formed using a multi-axis robot.

The multi-axis robot may be a five axis robot.

Forming the bottom layer of electrically and thermally insulating material in a defined pattern directly on the airfoil component by additive manufacturing may include curing the material with ultraviolet radiation, a laser, microwave radiation, thermal exposure, and combinations thereof.

The electrical and thermally insulating material may be a polymer, ceramic, and mixtures thereof.

The bottom layer may include polyimide, silicone, fluoropolymer, glass, UV curable resin, polymers with additives, insulating oxides and mixtures thereof.

The bottom layer may include ceramic or composite including aluminum oxide, polymer matrix composites, glass, nitride base coatings, and mixtures thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A multilayer structure for deicing an aircraft airfoil component, comprising:
   an electrically and thermally insulating bottom layer formed in a defined pattern directly on the aircraft airfoil component;
   an electro-thermal middle layer of electrically resistant heater element arrays formed in the defined pattern on the electrically and thermally insulating bottom layer; and
   a thermally conductive and electrically insulating top layer encapsulating the electrically and thermally insulating bottom layer and the electro-thermal middle layer of electrically resistant heater element arrays.

2. The structure of claim 1, wherein the bottom layer is composed of a polymer, ceramic, or mixture thereof.

3. The structure of claim 2, wherein the bottom layer comprises polyimide, silicone, fluoropolymer, glass, UV curable resin, polymers with additives or insulating oxides.

4. The structure of claim 2, wherein the bottom layer comprises a ceramic or composite including aluminum oxide, polymer matrix composites, glass, or nitride based coatings.

5. The structure of claim 1, wherein the heater element arrays comprise silver, iron, chromium, copper, nickel, cobalt, aluminum and alloys thereof, graphene, graphite, carbon black, carbon nanotubes, carbon nanofibers and/or mixtures thereof.

6. The structure of claim 1 wherein the top layer comprises aluminum nitride, vanadium oxide, boron nitride, silicon nitride, silicon oxycarbide, silicon carbide, silicate based glass mixtures and additives with high thermal conductivity including silicon carbide, boron carbide, carbon nanotubes, graphene, diamond, and/or mixtures thereof.

7. The multilayer structure of claim 1, wherein the electrically and thermally insulating bottom layer and the electrothermal middle layer of electrically resistant heater element arrays are formed by additive manufacturing.

8. The multilayer structure of claim 7, wherein additive manufacturing comprises aerosol jet deposition, extrusion, ink jet, micro-cold spray deposition, miniaturized thermal spray deposition, ultrasonic spray deposition and/or combinations thereof.

9. The multilayer structure of claim 1, wherein trace widths of the heater element arrays are from 15 microns to 3 millimeters and trace thicknesses of the heater element arrays are from 100 nanometers to 1 millimeter.

10. A method of forming a multilayer structure for deicing an aircraft airfoil component, the method comprising:
    forming a bottom layer of electrically and thermally insulating material in a defined pattern directly on the airfoil component by additive manufacturing;
    forming an electrothermal middle layer of electrically resistant heater element arrays in the defined pattern on the electrically and thermally insulating bottom layer by additive manufacturing; and forming a thermally conductive and electrically insulative top layer encapsulating the electrically and thermally insulating bottom layer and the electro-thermal middle layer of electrically resistant heater element arrays by additive manufacturing or thermal spraying.

11. The method of claim 10, wherein additive manufacturing comprises aerosol jet deposition, extrusion, ink jet, micro-cold spray deposition, miniaturized thermal spray deposition, ultrasonic spray deposition and/or combinations thereof.

12. The method of claim 10, wherein the heater element arrays comprise silver, iron, chromium, copper, nickel, cobalt, aluminum and alloys thereof, graphene, graphite, carbon black, carbon nanotubes, carbon nanofibers and/or mixtures thereof.

13. The method of claim 12, wherein trace widths of the heater element arrays are from 15 microns to 3 millimeters and trace thicknesses of the heater element arrays are from 100 nanometers to 1 millimeter.

14. The method of claim 10, wherein the top layer comprises aluminum nitride, vanadium oxide, boron nitride, silicon nitride, silicon oxycarbide, silicon carbide, silicate based glass, boron nitride, and additives with high thermal conductivity including silicon carbide, boron carbide, carbon nanotubes, graphene, diamond, and/or mixtures thereof.

15. The method of claim 10, wherein each layer of the additively manufactured multilayer structure is formed using a multi-axis robot.

16. The method of claim 15, wherein the multi-axis robot is a 5 axis robot.

17. The method of claim 10, wherein forming the bottom layer of electrically and thermally insulating material in a defined pattern directly on the airfoil component by additive manufacturing comprises curing the material with ultraviolet radiation, a laser, microwave irradiation, thermal exposure, and/or combinations thereof.

18. The method of claim 10, wherein the electrical and thermally insulating material is composed of a polymer, ceramic, and/or mixtures thereof.

19. The method of claim 18, wherein the bottom layer comprises polyimide, silicone, fluoropolymer, glass, UV curable resin, polymers with additives, insulating oxides and/or mixtures thereof.

20. The structure of claim 18, wherein the bottom layer comprises ceramic or composite including aluminum oxide, polymer matrix composites, glass, nitride based coatings, and/or mixtures thereof.

* * * * *